(12) United States Patent
Islam et al.

(10) Patent No.: US 7,549,018 B2
(45) Date of Patent: Jun. 16, 2009

(54) CONFIGURABLE BLADE ENCLOSURE

(75) Inventors: Shah Mohammad Rezaul Islam, Tucson, AZ (US); Gregg Steven Lucas, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 495 days.

(21) Appl. No.: 11/462,042

(22) Filed: Aug. 3, 2006

(65) Prior Publication Data
US 2008/0034067 A1 Feb. 7, 2008

(51) Int. Cl.
G06F 12/00 (2006.01)
G06F 15/177 (2006.01)

(52) U.S. Cl. .................. 711/114; 711/170; 709/220; 709/221

(58) Field of Classification Search .................. 711/114, 711/170; 709/220, 221
See application file for complete search history.

(56) References Cited

U.S. PATENT DOCUMENTS

| 6,865,157 B1 | 3/2005 | Scott et al. | |
| 6,931,475 B2 | 8/2005 | Huang et al. | |
| 2003/0033364 A1 | 2/2003 | Garnett et al. | |
| 2003/0033365 A1 | 2/2003 | Garnett et al. | |
| 2005/0105542 A1 | 5/2005 | Seki et al. | |
| 2006/0265449 A1* | 11/2006 | Uemura et al. | 709/203 |
| 2008/0126696 A1* | 5/2008 | Holland et al. | 711/114 |

* cited by examiner

Primary Examiner—Jack A Lane
(74) Attorney, Agent, or Firm—Dan Shifrin

(57) ABSTRACT

A blade enclosure is provided which may accommodate a first configuration which includes integrated drive enclosure blades (I-DEBs) or a second configuration which includes I-DEBs and non-integrated or switched DEBs (S-DEBs). Each I-DEB includes a pair of redundant RAID controllers, each having two configurable ports. In the first configuration, all four ports are configured as host adapter (HA) ports through which data is exchanged with server blades. In the second configuration, one port of each RAID controller is configured as an HA port, through which data is exchanged with server blades, and the other port of each RAID controller is configured as a device adapter (DA) port, through which data may be exchanged with the S-DEB. Zones may also be established to separate traffic between the servers and the I-DEB from traffic between the I-DES and the S-DEB.

20 Claims, 7 Drawing Sheets

CONFIGURABLE BLADE ENCLOSURE

TECHNICAL FIELD

The present invention relates generally to blade technology in which enclosures are densely populated with one or more types of computing components and, in particular, to a blade enclosure which is easily configurable and re-configurable to accommodate different types of storage blades.

BACKGROUND ART

"Blade" computing systems have become popular recently due in part to the ability to house various primary components in slots in a relatively small enclosure. In addition, blade systems have the advantage of allowing customers to quickly and easily remove and install components to customize the system as the customer's needs change. The components install in slots in the enclosure and connect through a backplane or mid-plane (hereinafter "connector plane"); thus, customization may be performed without removing, connecting or moving cables.

Through the use of switches, a "universal fabric" may be created in which, for the most part, a component in any slot is able to be coupled to and communicate with a component in any other slot as well as to externally connected components. Despite this benefit, in many systems it is necessary to separate data traffic between one set of components from data traffic between another set of components in order to prevent contamination of data. Zones may be created to establish such separation. For example, an IBM® BladeCenter®, may include processor or server blades, a pair of redundant switches, one or more integrated drive enclosure blades (I-DEBs) and an enclosure management module, as well as power supplies and cooling, within the same blade enclosure. The I-DEB includes a pair of redundant RAID controllers and a number of multiple disk drive trays (MDTs). Zoning keeps traffic between the server blades and the RAID controllers separate from traffic between RAID controller and the MDTs.

Additionally, each RAID controller in the I-DEB is coupled to the switch (via a connector plane) through host adapter (HA) ports while the MDTs are coupled within the I-DEB to the RAID controllers through device adapter (DA) ports. This configuration permits both high availability (through the use of redundancy) and high performance (through the use of multiple ports). However, another form of DEB, a switched or non-integrated DEB (S-DEB) includes only MDTs and is managed by RAID controllers in an I-DEB but is coupled through DA ports. Consequently, with all ports of the I-DEB being used to exchange data with the server blade(s), the I-DEB has no unused ports with which to connect to an S-DEB installed in the blade enclosure without the use of cabling. And, in addition to increasing the complexity of the system and raising the risk of misconnections, cabling runs contrary to the philosophy and goals of a blade enclosure.

Consequently, it remains desirable for a blade system which is sufficiently flexible to be able to accommodate an I-DEB, with its integrated RAID controllers, and one or more S-DEBs, installed on the same internal connector plane and managed by the RAID controllers.

SUMMARY OF THE INVENTION

The present invention provides a blade enclosure having at least one server blade, first and second redundant switches, an integrated drive enclosure blade (I-DEB) and an enclosure management module programmed. Each switch includes a first plurality of host adapter (HA) pods to which the at least one server blade is connectable and a second plurality of ports to which a plurality of drive enclosure blades (DEB) are connectable. The I-DEB includes first and second redundant RAID controllers and at least one multi-drive tray (MDT) coupled to both RAID controllers through a pair of redundant DA ports. Both RAID controllers include first and second configurable ports connectable to corresponding ports of the second plurality of ports of the first and second switches, respectively, and a pair of device adapter (DA) ports.

The enclosure management module is programmed to selectively configure, in response to an input, the blade enclosure in a first configuration and a second configuration. The first configuration comprises the first and second ports of both of the first and second RAID controllers configured as HA ports through which the first and second RAID controllers are accessible to the server blades. The first configuration further includes a first zone comprising the I-DEB and the plurality of server blades.

The second configuration comprises at least one non-integrated drive enclosure blade (S-DEB), each connected through DA ports to the first and second switches. The first port of both of the first and second RAID controllers is configured as a HA port through which the first and second RAID controllers are accessible to the server blades, via the first and second switches, and the second port of both of the first and second RAID controllers is configured as a DA port through which each of the at least one S-DEBs is accessible to the first and second RAID controllers, via the first and second switches. The second configuration further includes a modified first zone and a second zone comprising the I-DEB and the at least one S-DEB.

The present invention further includes a method of configuring a blade enclosure housing, an enclosure management module, at least one server blade, first and second redundant switches and an integrated drive enclosure blade (I-DEB) the I-DEB including redundant first and second RAID controllers and a non in-integrated DEB (S-DEB). The method includes executing one of a first set of instructions or a second set of instructions by the enclosure management module that the blade enclosure be configured in one of a first configuration or a second configuration, respectively. If the first set of instructions is executed, first and second ports of both the first and second RAID controllers are configured as host adapter (HA) ports, first and second ports of both the first and second switches are configured as HA ports. In addition, a first zone is established comprising the I-DEB and the at least one server blade, whereby each of the first and second RAID controllers are connected to the at least one blade server through two HA ports.

If the second set of instructions is executed, a non-integrated drive enclosure blade (S-DEB) connected to the first and second switches is recognized, the first port of both the first and second RAID controllers are configured as HA ports, the second port of both the first and second RAID controllers are configured as DA ports, the first port of both the first and second switches are configured as HA ports and the second port of both the first and second switches are configured as DA ports. In addition, a modified first zone is established, comprising the I-DEB and the at least one server blade, whereby the first and second RAID controllers are each connected to the plurality of blade servers through the respective first ports of the first and second RAID controllers. A second zone is established comprising the I-DEB and the S-DEB, whereby the S-DEB is connected to the first and second RAID controllers through the respective second ports of the first and second RAID controllers.

DETAILED DESCRIPTION OF THE PREFERRED EMBODIMENT

Figure 1:
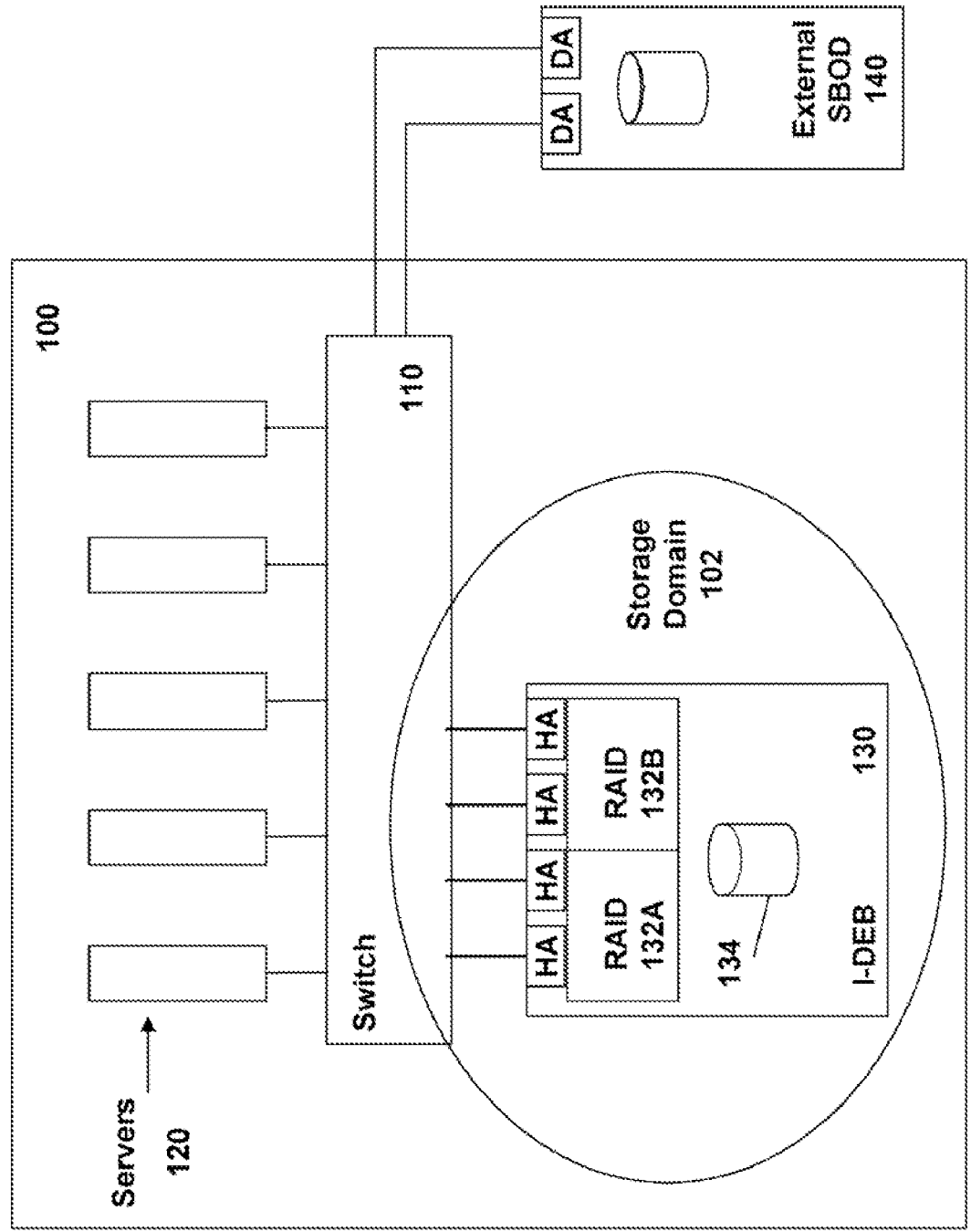
FIG. 1 is a generalized block diagram of a current version of a blade enclosure.

FIG. 1 is a generalized block diagram of a current version of a blade enclosure 100, such as an IBM BladeCenter. The blade enclosure 100 includes a redundant pair of multi-port switches, represented in FIG. 1 by a single block 110, to which various blades connect. Coupled to the switches 110 through host adapter (HA) ports are one or more processor or server blades 120. Also coupled to the switches 110 through HA ports are one or more integrated drive enclosure blades (I-DEBs) 130, each including a redundant pair of RAID adapters 132A, 132B and a number of multi-drive trays (MDTs) 134. In one configuration, the I-DEB 130 can have up to six MDTs 134 with three hard disk drives each. The one or more I-DEBs comprise a storage domain or zone 102. Each RAID controller 132A, 132B is coupled to each of the two redundant switches 110 through an HA port; thus data may be exchanged with the servers 120 though a total of four channels, providing high availability and high performance. The RAID controllers 132A, 132B have no extra ports with which to connect to non-HA devices, such as a non-integrated drive enclosure blade or SBOD) 140. Such devices are coupled externally with cables.

Figure 2:
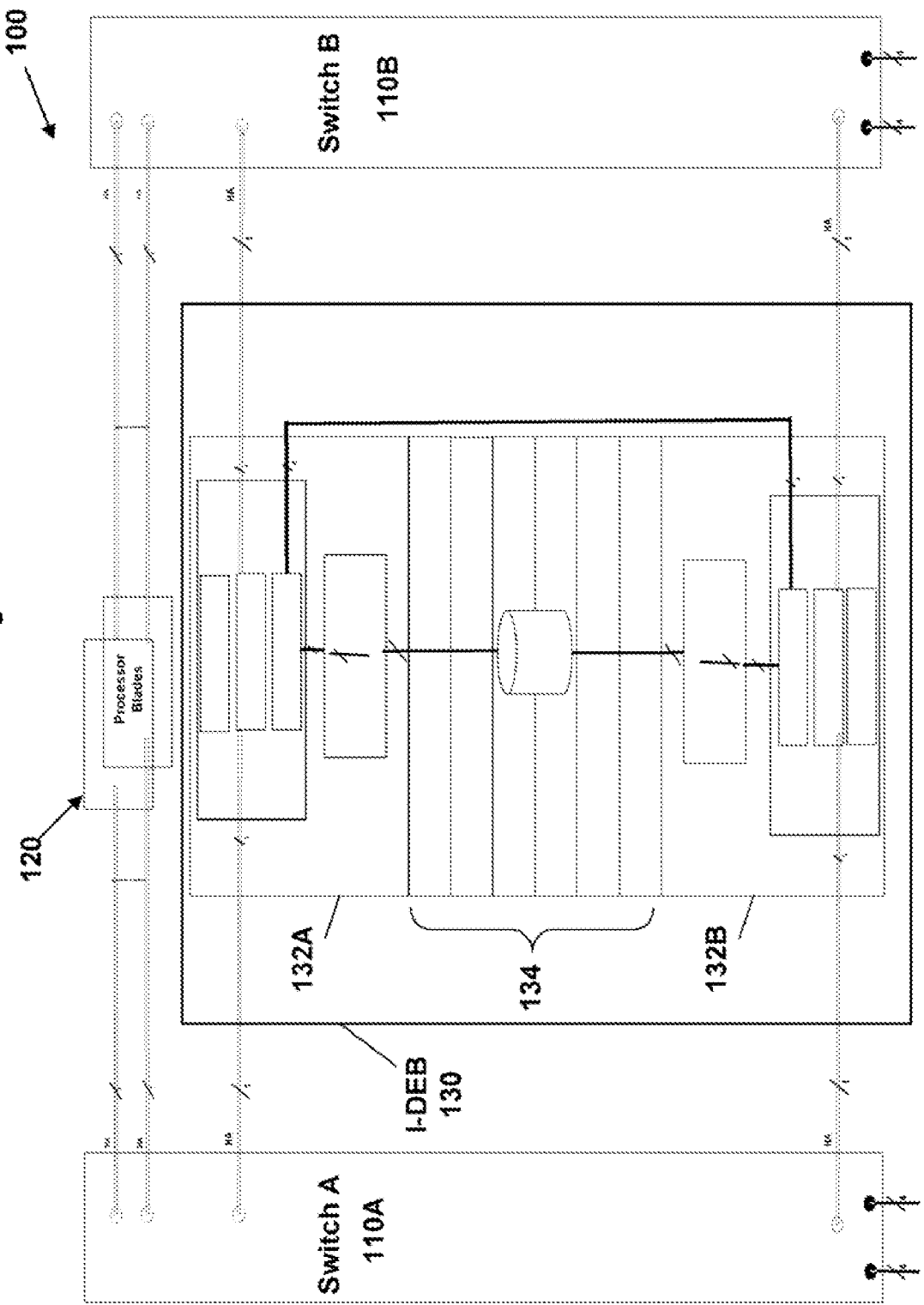
FIG. 2 is a more detailed block diagram of the blade enclosure of FIG. 1.

FIG. 2 is a more detailed block diagram of the blade enclosure 100 of FIG. 1 and illustrates interconnections of the server blades 120 and the I-DEB 130 with the pair of redundant switches 110A, 110B through HA ports. Additionally, FIG. 2 illustrates interconnections of the redundant RAID controllers 132A, 132B and MDT 134 within the I-DEB 130.

Figure 3A:
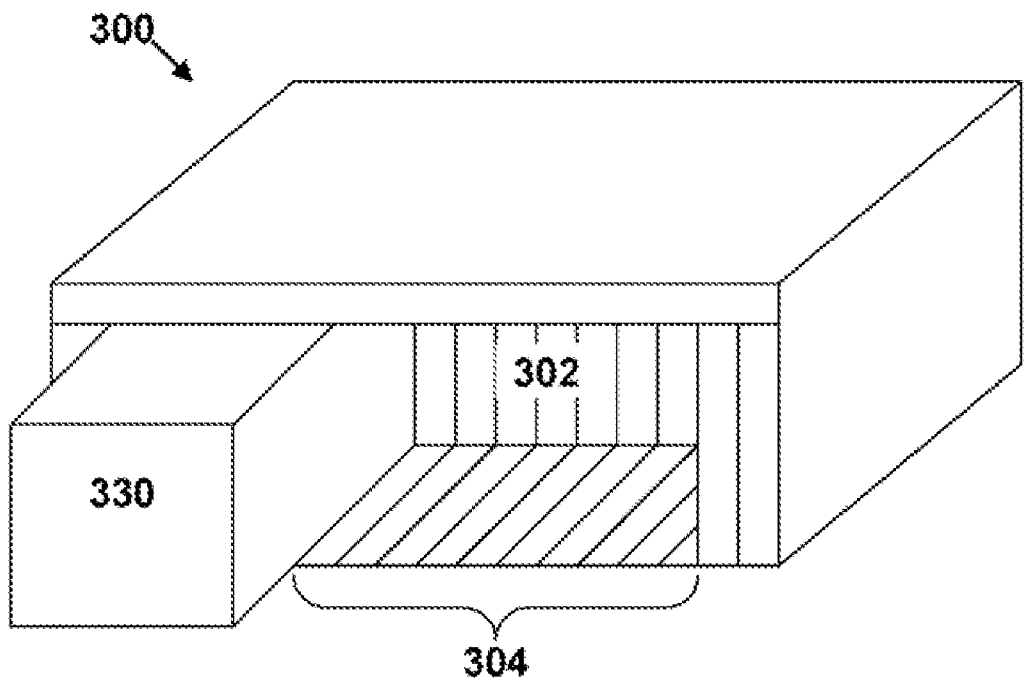
FIGS. 3A and 3B illustrate front and rear perspective views, respectively, of a blade enclosure of the present invention.
Figure 3B:
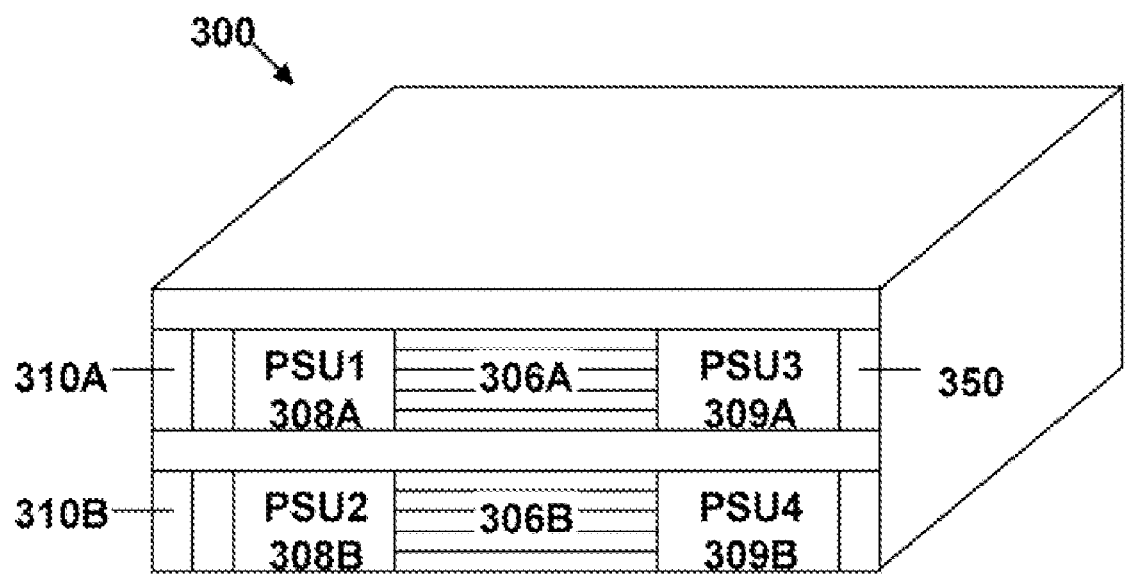

FIGS. 3A and 3B are front and rear perspective views, respectively, of a blade enclosure 300 of the present invention. The enclosure 300 includes a mid- or back-plane 302 (generically referred to herein as a "connector plane") and slots 304 into which blades, such as an I-DEB 330, are inserted from the front (FIG. 3A) to mate with appropriate connectors on the front of the connector plane 302. The IBM eServer™ BladeCenter includes fourteen such slots 304 accessible from the front. The rear of the blade enclosure 300 (FIG. 3B) includes slots to hold additional components or modules for connection to the rear of the connector plane 302. Such modules may include, for example, two blowers 306A, 306B, up to two redundant pairs of power supply units (PSUs) 30*A, 308B, 309A, 309B, a redundant pair of serial attached SCSI (SAS) switches 310A, 310B (or, collectively, 310) and an enclosure management module 350. Such components are inserted from the rear of the enclosure 300 to mate with appropriate connectors on the rear of the connector plane 302.

Figure 4:
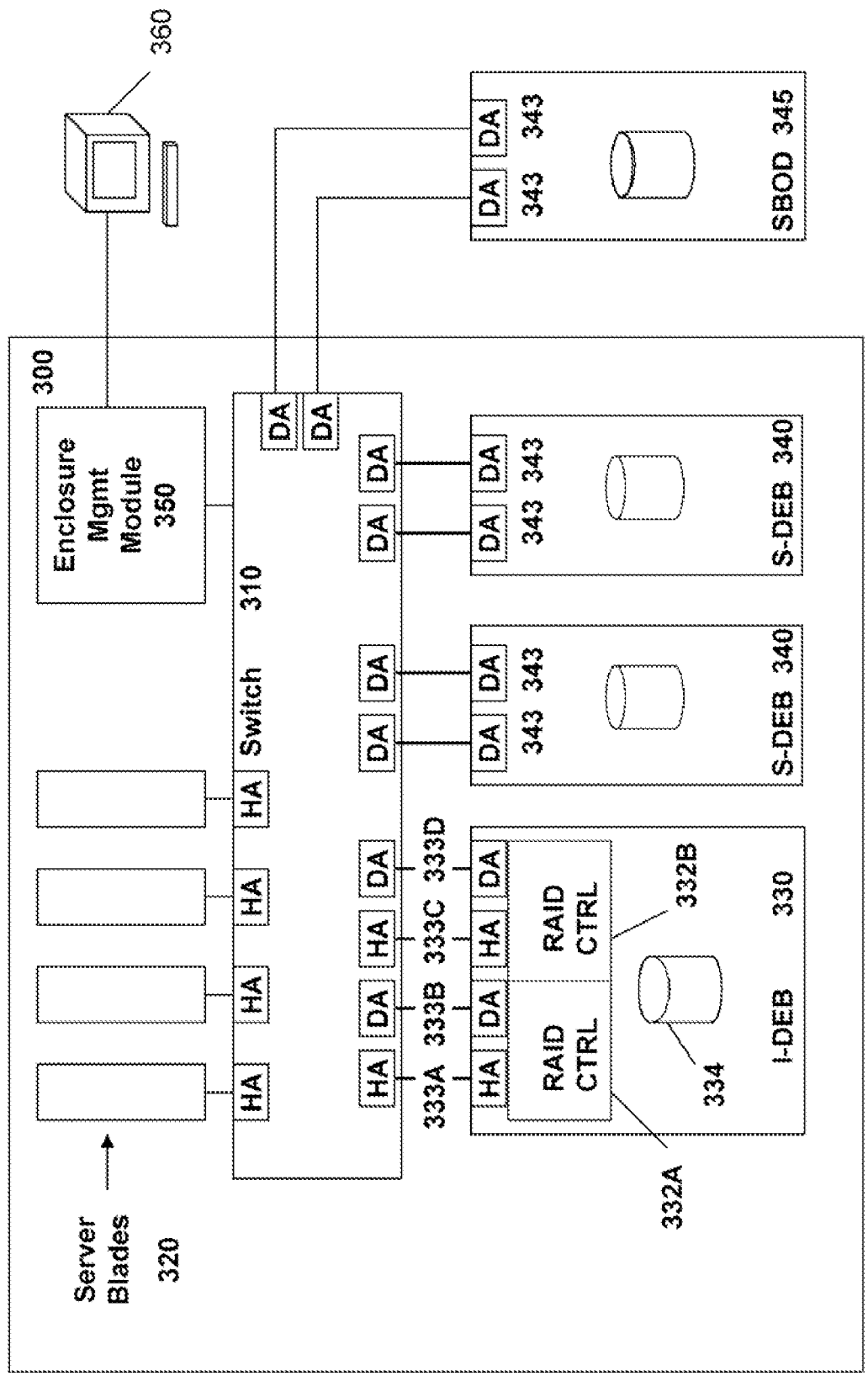
FIG. 4 is a generalized block diagram of the blade enclosure according to the present invention.

FIG. 4 is a generalized block diagram of the blade enclosure 300, including a redundant pair of switches (represented by a single block 310), one or more server blades 320, an I-DEB 330 and a enclosure management module 350. The I-DEB 330 includes a pair of redundant RAID controllers 332A, 332B and one or more MDTs 334. In accordance with the present invention, the I-DEB ports 333A, 333B, 333C, 333D are configurable as either HA ports or DA ports. Additionally, the blade enclosure 300 of the present invention accommodates one or more internally installed S-DEBs 340 as well as one or more external S-DEBs (which may be SBODs) 345 coupled to the switch 310 through DA ports 343.

Figure 5:
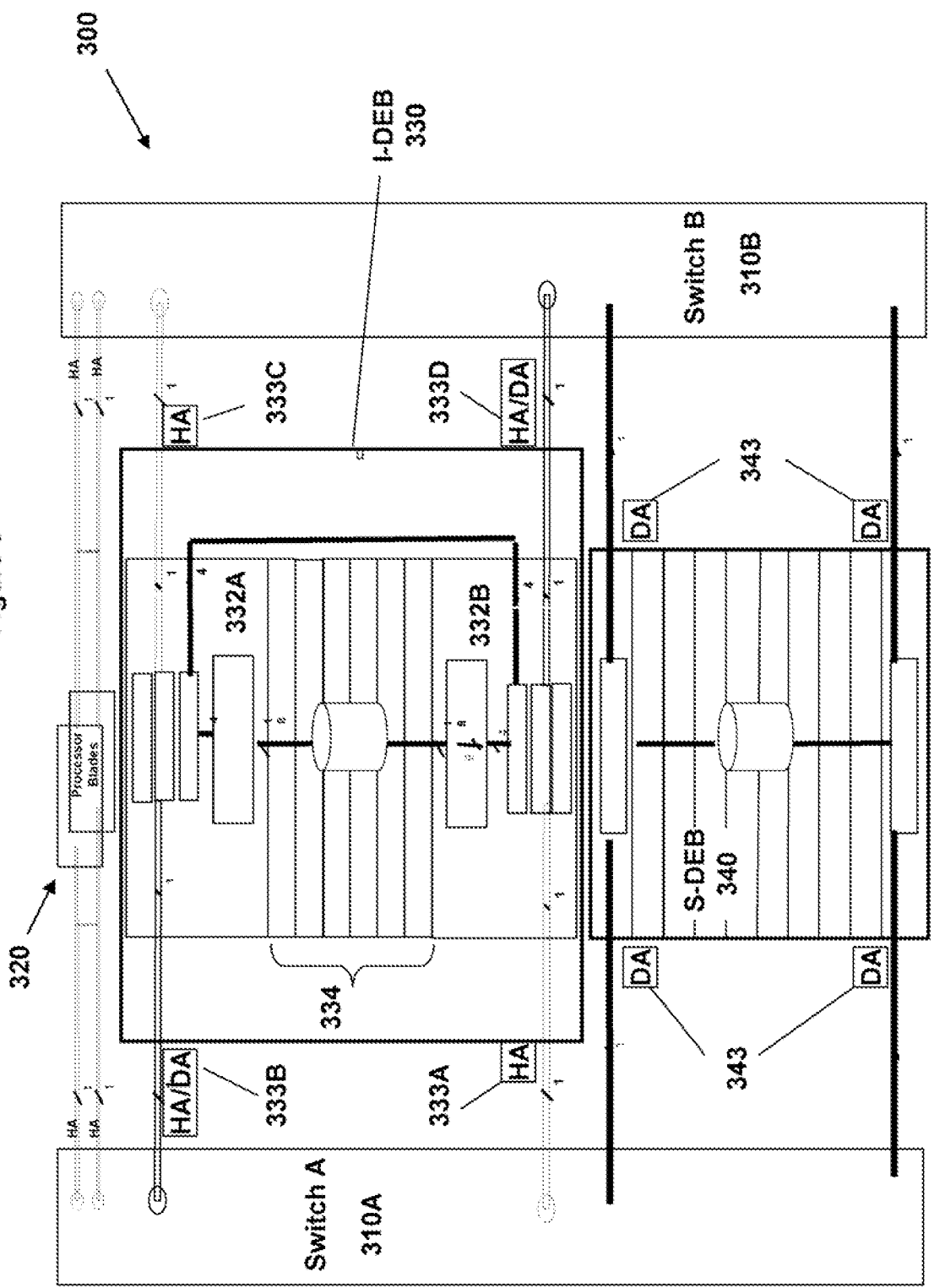
FIG. 5 is a more detailed block diagram of the blade enclosure of FIG. 4.

FIG. 5 is a more detailed block diagram of the blade enclosure 300 of FIG. 4 and illustrates interconnections of the server blades 320, the I-DEB 330 and the internally installed S-DEB 340 with the pair of redundant switches 310A 310B through the HA and DA ports and the interconnections of the redundant RAID controllers 332A, 332B and MDTs 334 within the I-DEB 330. Additionally, a configuration terminal 360, having a user interface, is coupled to the enclosure management module 350.

In operation, a system administrator, vendor service technician or the like installs blades into slots in the enclosure 300. Blades may be hot swapped if the enclosure 300 is already powered on. If not, the enclosure 300 may be powered on. A discovery routine is performed by the enclosure management module 350 to determine the configuration of the enclosure 300; that is, to detect what devices are installed in the enclosure 300 and connected to the switches 310A, 310B. In one configuration, the only installed storage device is the I-DEB 330. The enclosure management module 350 transmits instructions to the I-DEB 330 to configure all of the ports 333A, 333B, 333C, 333D as HA ports. The enclosure management module 350 also transmits instructions to the switches 310A, 320B to configure corresponding switch ports as HA ports. Thus, a customer may be provided with the highest performance and availability for exchanges between the servers 320 and the RAID controllers 332A, 332B in the I-DEB 330.

In a different configuration, one or more S-DEBs 340 are installed in the enclosure along with the I-DEB 330. The enclosure management module 350 transmits instructions to the I-DEB 330 to configure one port 333A, 333C of each RAID controller 332A, 332B as an HA port and one port 333B, 333D as DA ports. The enclosure management module 350 also transmits instructions to the switches 310A, 320B to configure corresponding switch ports as HA or DA ports. Thus, the customer may be provided with greater data storage capacity. In this second configuration, the external SBOD storage 345 may now be accessed by the RAID Controllers.

In one embodiment, the configuration/reconfiguration of ports is performed automatically by the enclosure management module 350 when it detects a different configuration of blades within the enclosure 300. In an alternative embodiment, the enclosure management module 350 transmits the contents of the enclosure 300 to the configuration terminal 360. A system administrator or other user using the user interface may then determine how to configure enclosure 300. Moreover, the drives in the S-DEB 340 may be configured in any of a number of ways: RAID, non-RAID, as well as any of various levels of RAID.

Figure 6A:
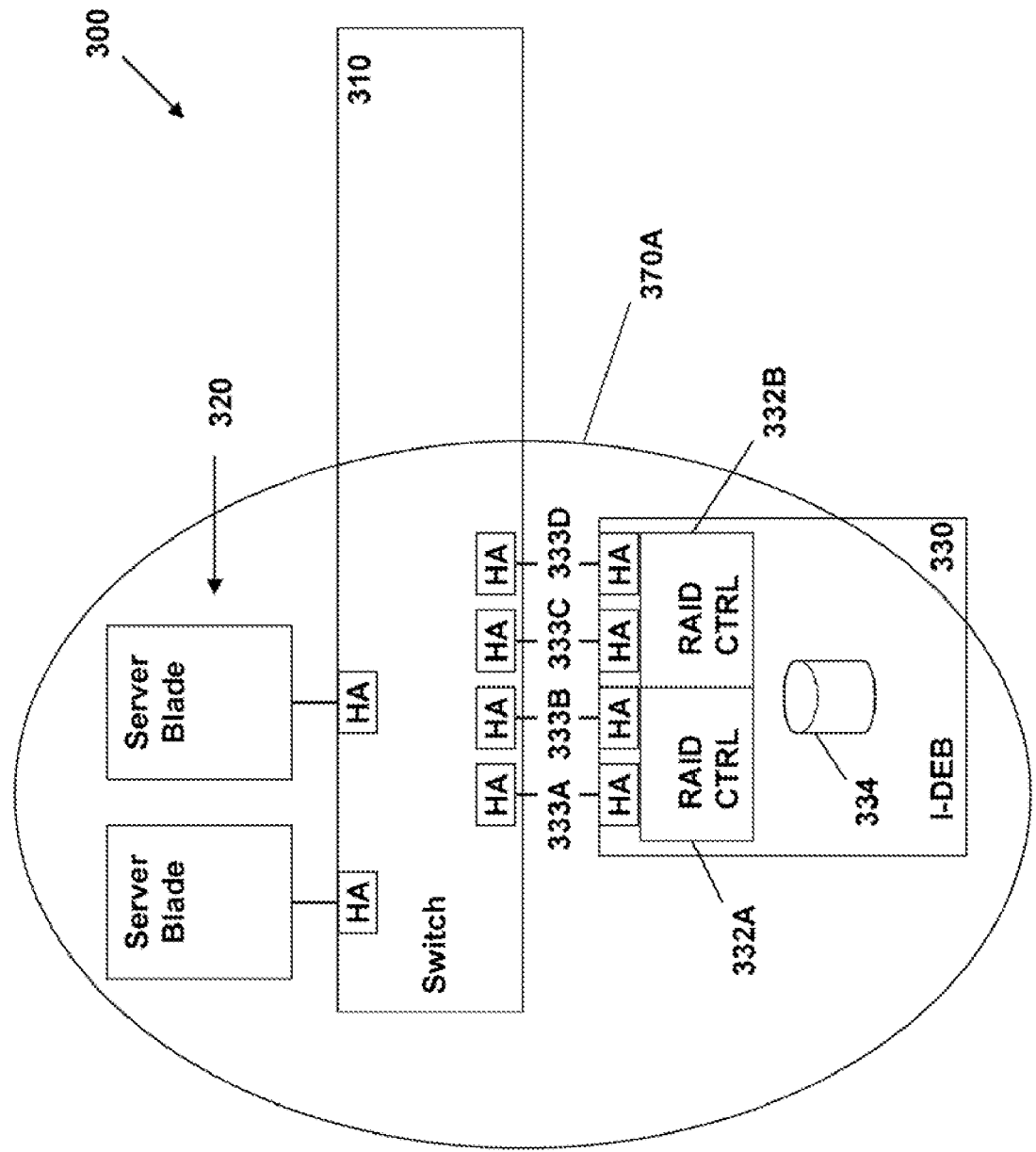
FIGS. 6A and 6B illustrate zones which may be established in the blade enclosure of the present invention to keep server traffic separate from storage traffic.
Figure 6B:
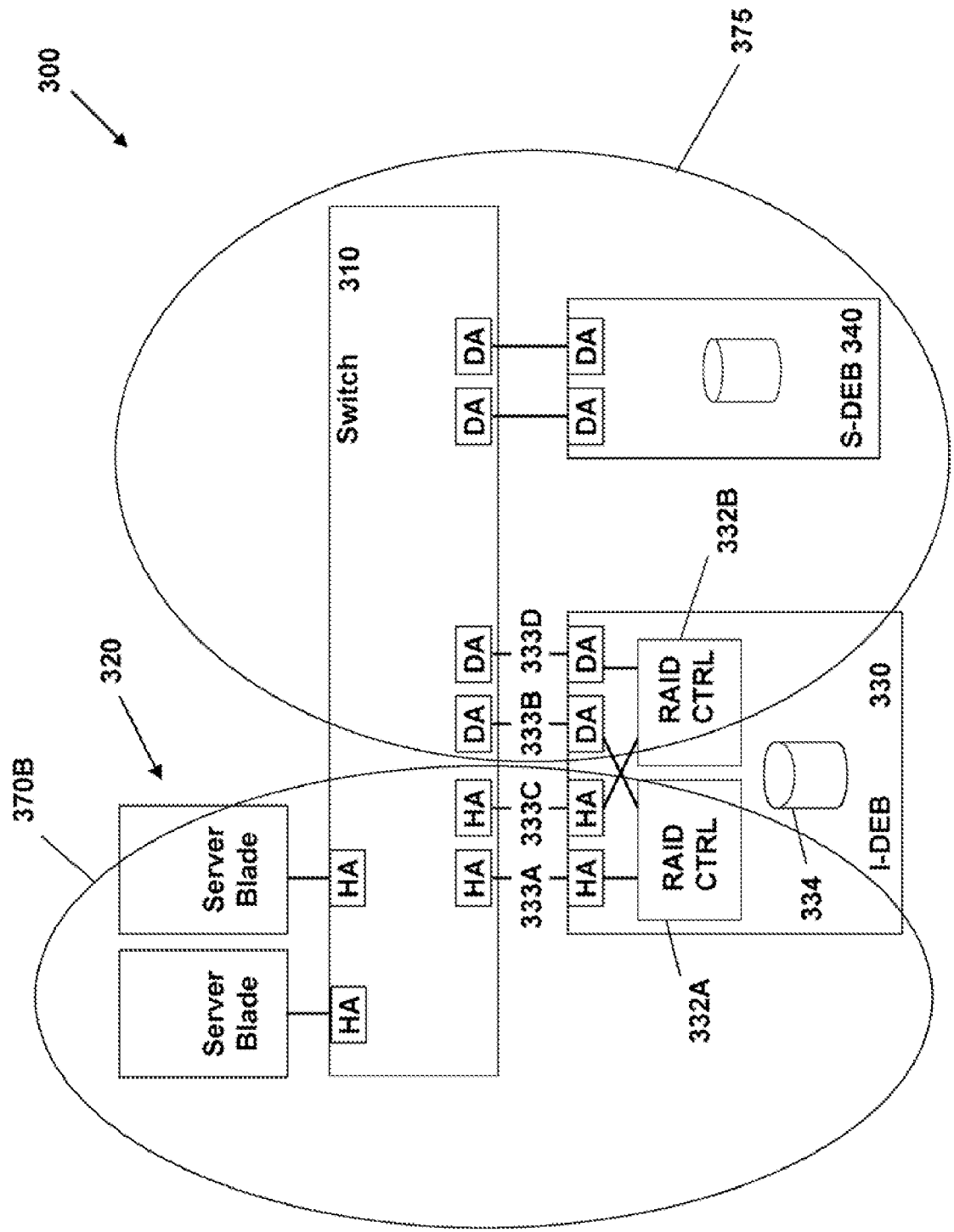

In order to prevent contamination of customer data, the devices within the enclosure 300 are selectively zoned as illustrated in FIGS. 6A and 6B. In the first configuration (FIG. 6A) a first zone 370A includes the server blades 320 and the I-DEB 330 as well as appropriate interconnections in the switch 310. The first zone 370A is established by the enclosure management module 350 and takes advantage of both ports, configured as HA ports 333A, 333B, 333C, 333D, of both RAID controllers 332A, 332B.

In the second configuration, (FIG. 6B) the first zone 370B is modified to includes the server blades 320 and the I-DEB 330 through the HA ports 333A, 333C as well as appropriate interconnections in the switch 310. A second zone 375 is established by the enclosure management module 350 and includes the S-DEB 340 and the I-DEB 330, with one port 333B, 333D of each RAID controller 332A, 332B configured as a DA port, as well as appropriate interconnections in the switch 310.

It is important to note that while the present invention has been described in the context of a fully functioning data processing system those of ordinary skill in the art will appreciate that the processes of the present invention are capable of being distributed in the form of a computer readable medium of instructions and a variety of forms and that the present invention applies regardless of the particular type of signal bearing media actually used to carry out the distribution. Examples of computer readable media include recordable-type media such as a floppy disk, a hard disk drive, a RAM, and CD-ROMs and transmission-type media such as digital and analog communication links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. Moreover, although described above with respect to methods and systems, the need in the art may also be met with a computer program product containing instructions for configuring a blade enclosure or a method for deploying computing infrastructure comprising integrating computer readable code into a computing system for configuring a blade enclosure.

What is claimed is:

1. A blade enclosure, comprising:
   at least one server blade;
   first and second redundant switches, each switch, including:
      a first plurality of host adapter (HA) ports to which the at least one server blade is connectable; and
      a second plurality of ports to which a plurality of drive enclosure blades (DEB) are connectable;
   an integrated drive enclosure blade (I-DEB), comprising:
      first and second redundant RAID controllers, both RAID controllers including first and second configurable ports connectable to corresponding ports of the second plurality of ports of the first and second switches, respectively, and both RAID controllers further including a pair of device adapter (DA) ports; and
      a multi-drive tray (MDT) coupled to both RAID controllers through a pair of redundant DA ports;
   an enclosure management module programmed to selectively configure, in response to an input, the blade enclosure in a first configuration and a second configuration;
   the first configuration comprising:
      the first and second ports of both of the first and second RAID controllers configured as HA ports through which the first and second RAID controllers are accessible to the server blades; and
      a first zone comprising the I-DEB and the plurality of server blades;
   the second configuration comprising:
      at least one non-integrated drive enclosure blade (S-DEB), each connected through DA ports to the first and second switches;
      the first port of both of the first and second RAID controllers configured as HA ports through which the first and second RAID controllers are accessible to the server blades;
      the second port of both of the first and second RAID controllers configured as DA ports through which each of the at least one S-DEBs is accessible to the first and second RAID controllers; and
      a modified first zone and a second zone comprising the I-DEB and the at least one S-DEB.

2. The blade enclosure of claim 1 further comprising a user interface through which a system administrator transmits the input to the enclosure management module.

3. The blade enclosure of claim 1, further comprising a connector plane to which the at least one server blade, the first and second switches, the I-DEB and the at least one S-DEB are directly connected.

4. The blade enclosure of claim 1 wherein:
   the at least one S-DEB is an SBOD in an expansion enclosure external to the blade enclosure,
   the blade enclosure further comprises a connector plane to which the at least one server blade, the first and second switches and the I-DEB are directly connected; and
   the first and second switches further comprise a third plurality of ports to which the at least one S-DEB is connectable through a cable.

5. A method of configuring a blade enclosure housing an enclosure management module, at least one server blade, first and second redundant switches and an integrated drive enclosure blade (I-DEB), the I-DEB including redundant first and second RAID controllers, the method comprising:
   executing one of a first set of instructions or a second set of instructions by the enclosure management module that the blade enclosure be configured in one of a first configuration or a second configuration, respectively;
   if the first set of instructions is executed:
      configuring first and second ports of both the first and second RAID controllers as host adapter (HA) ports;
      configuring first and second ports of both the first and second switches as HA ports; and
      establishing a first zone comprising the I-DEB and the at least one server blade, whereby each of the first and second RAID controllers are connected to the at least one blade server through two HA ports; and
   if the second set of instructions is executed:
      recognizing a non-integrated drive enclosure blade (S-DEB) connected to the first and second switches;
      configuring the first port of both the first and second RAID controllers as HA ports;
      configuring the second port of both the first and second RAID controllers as DA ports;
      configuring the first port of both the first and second switches as HA ports;
      configuring the second port of both the first and second switches as DA ports;
      establishing a modified first zone comprising the I-DEB and the at least one server blade, whereby the first and second RAID controllers are each connected to the plurality of blade servers through the respective first ports of the first and second RAID controllers; and establishing a second zone comprising the I-DEB and the S-DEB, whereby the S-DEB is connected to the first and second RAID controllers through the respective second ports of the first and second RAID controllers.

6. The method of claim 5, further comprising receiving a first user selection or a second user selection, the first user selection requesting that the enclosure management module execute the first set of instructions and the second user selection requesting that the enclosure management module execute the second set of instructions.

7. The method of claim 5, wherein the S-DEB is installed within the blade enclosure.

8. The method of claim 5, wherein the S-DEB is an SBOD installed in an expansion enclosure external to the blade enclosure and connected to the first and second switches through a cable.

9. A reconfigurable blade enclosure, comprising:
a plurality of slots;
a plane having a plurality of connectors associated with the slots for receiving devices;
a switch installed in a slot and interconnected with at least one connector, the switch having a plurality of ports;
a server blade installed in a slot and interconnected with at least one connector, the server blade having a host adapter (HA) port which is coupled through plane connectors to a port on the switch;
an integrated drive enclosure blade (I-DEB) installed in a slot and interconnected with two connectors, the I-DEB including a RAID controller having first and second ports which are coupled through plane connectors to ports on the switch; and
an enclosure management module operable to selectively configure the blade enclosure into a first configuration or a second configuration;
wherein, in the first configuration:
the first and second ports of the RAID controller are configured as HA ports through which the RAID controller is accessible to the server blade; and
a first zone is established comprising the server blade and the I-DEB; and
wherein, in the second configuration:
the first port of the RAID controller is configured as an HA port through which the RAID controller is accessible to the server blade;
the second port of the RAID controller is configured as a device adapter (DA) port; and
the blade enclosure further comprises:
a first zone including the I-DEB and the server blade; and
a second zone including the I-DEB and a non-integrated drive enclosure blade (S-DEB) having a device adapter (DA) port accessible by the RAID controller through the second port of the RAID controller.

10. The blade enclosure of claim 9, further comprising a user interface through which a system administrator provides instructions to the enclosure management module.

11. The blade enclosure of claim 9, wherein the S-DEB is installed in a slot and directly interconnected to at least one connector on the plane.

12. The blade enclosure of claim 9, wherein the S-DEB is an SBOD installed in an expansion enclosure external to the blade enclosure and interconnected with the switch through a cable.

13. A computer program product of a computer readable medium usable with a programmable computer, the computer program product having computer-readable code embodied therein for configuring a blade enclosure housing an enclosure management module, at least one server blade, first and second redundant switches and an integrated drive enclosure blade (I-DEB), the I-DEB including redundant first and second RAID controllers, the computer-readable code comprising instructions for:
executing one of a first set of instructions or a second set of instructions by the enclosure management module that the blade enclosure be configured in one of a first configuration or a second configuration, respectively;
if the first set of instructions is executed:
configuring first and second ports of both the first and second RAID controllers as host adapter (HA) ports;
configuring first and second ports of both the first and second switches as HA ports; and
establishing a first zone comprising the I-DEB and the at least one server blade, whereby each of the first and second RAID controllers are connected to the at least one blade server through two HA ports; and
if the second set of instructions is executed:
recognizing a non-integrated drive enclosure blade (S-DEB) connected to the first and second switches;
configuring the first port of both the first and second RAID controllers as HA ports;
configuring the second port of both the first and second RAID controllers as DA ports;
configuring the first port of both the first and second switches as HA ports;
configuring the second port of both the first and second switches as DA ports;
establishing a modified first zone comprising the I-DEB and the at least one server blade, whereby the first and second RAID controllers are each connected to the plurality of blade servers through the respective first ports of the first and second RAID controllers; and
establishing a second zone comprising the I-DEB and the S-DEB, whereby the S-DEB is connected to the first and second RAID controllers through the respective second ports of the first and second RAID controllers.

14. The computer program product of claim 13, the computer-readable code further comprising instructions for receiving a first user selection or a second user selection, the first user selection requesting that the enclosure management module execute the first set of instructions and the second user selection requesting that the enclosure management module execute the second set of instructions.

15. The computer program product of claim 13, wherein the S-DEB is installed within the blade enclosure.

16. The computer program product of claim 13, wherein the S-DEB is an SBOD installed in an expansion enclosure external to the blade enclosure and connected to the first and second switches through a cable.

17. A method for deploying computing infrastructure, comprising integrating computer readable code into a computing system, wherein the code, in combination with the computing system, is capable of performing the following in a blade enclosure housing an enclosure management module, at least one server blade, first and second redundant switches and an integrated drive enclosure blade (I-DEB), the I-DEB including redundant first and second RAID controllers, the method comprising:
executing one of a first set of instructions or a second set of instructions by the enclosure management module that the blade enclosure be configured in one of a first configuration or a second configuration, respectively:

if the first set of instructions is executed:
   configuring first and second ports of both the first and second RAID controllers as host adapter (HA) ports;
   configuring first and second ports of both the first and second switches as HA ports; and
   establishing a first zone comprising the I-DEB and the at least one server blade, whereby each of the first and second RAID controllers are connected to the at least one blade server through two HA ports; and if the second set of instructions is executed:
   recognizing a non-integrated drive enclosure blade (S-DEB) connected to the first and second switches;
   configuring the first port of both the first and second RAID controllers as HA ports;
   configuring the second port of both the first and second RAID controllers as DA ports;
   configuring the first port of both the first and second switches as HA ports;
   configuring the second port of both the first and second switches as DA ports;
   establishing a modified first zone comprising the I-DEB and the at least one server blade, whereby the first and second RAID controllers are each connected to the plurality of blade servers through the respective first ports of the first and second RAID controllers; and
   establishing a second zone comprising the I-DEB and the S-DEB, whereby the S-DEB is connected to the first and second RAID controllers through the respective second ports of the first and second RAID controllers.

18. The method of claim 17, further comprising receiving a first user selection or a second user selection, the first user selection requesting that the enclosure management module execute the first set of instructions and the second user selection requesting that the enclosure management module execute the second set of instructions.

19. The method of claim 17, wherein the S-DEB is installed within the blade enclosure.

20. The method of claim 17, wherein the S-DEB is an SBOD installed in an expansion enclosure external to the blade enclosure and connected to the first and second switches through a cable.

* * * * *